(12) United States Patent  (10) Patent No.: US 8,709,605 B2
Kitano et al.  (45) Date of Patent: Apr. 29, 2014

(54) INTERMEDIATE FILM FOR LAMINATED GLASSES, AND LAMINATED GLASS

(75) Inventors: Hirofumi Kitano, Kouka (JP); Juichi Fukatani, Kouka (JP); Daizou Ii, Kouka (JP); Takazumi Okabayashi, Osaka (JP); Ryuta Tsunoda, Kouka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 14/000,690

(22) PCT Filed: Feb. 23, 2012

(86) PCT No.: PCT/JP2012/054437
§ 371 (c)(1),
(2), (4) Date: Aug. 21, 2013

(87) PCT Pub. No.: WO2012/115197
PCT Pub. Date: Aug. 30, 2012

(65) Prior Publication Data
US 2013/0323517 A1  Dec. 5, 2013

(30) Foreign Application Priority Data
Feb. 23, 2011 (JP) ................. 2011-037629

(51) Int. Cl.
*B32B 17/10* (2006.01)
*B32B 27/08* (2006.01)
*B32B 27/42* (2006.01)

(52) U.S. Cl.
USPC ........... 428/436; 428/437; 428/441; 428/442; 428/524; 428/525

(58) Field of Classification Search
USPC .................. 428/436, 437, 441, 442, 524, 525
See application file for complete search history.

(56) References Cited

U.S. PATENT DOCUMENTS

| | | |
|---|---|---|
| 2005/0181220 A1 | 8/2005 | Kobata et al. |
| 2010/0220388 A1 | 9/2010 | Suzuki et al. |
| 2010/0279150 A1 | 11/2010 | Hatta et al. |

FOREIGN PATENT DOCUMENTS

| | | |
|---|---|---|
| JP | 7-178861 A | 7/1995 |
| JP | 2007-45636 A | 2/2007 |

(Continued)

OTHER PUBLICATIONS

English Translation of Written Opinion of the International Searching Authority (PCT/ISA/237) for Application No. PCT/JP2012/054437 mailed Sep. 6, 2013.

(Continued)

*Primary Examiner* — Callie E. Shosho
*Assistant Examiner* — Dhirajlal S. Nakarani
(74) *Attorney, Agent, or Firm* — Cheng Law Group, PLLC (57) ABSTRACT

The present invention provides an interlayer film for laminated glass which enables production of laminated glass having a high visible transmittance and excellent heat-shielding properties, and enables the laminated glass to retain the high visible transmittance for a long period of time; and provides laminated glass including the interlayer film. An interlayer film for laminated glass according to the present invention includes a first heat-shielding layer and at least one second heat-shielding layer. The first heat-shielding layer includes a thermoplastic resin and at least one component selected from a phthalocyanine compound, a naphthalocyanine compound, and an anthracocyanine compound. The second heat-shielding layer includes a thermoplastic resin and metal oxide particles. The laminated glass of the present invention includes a first member for laminated glass, a second member for laminated glass, and an interlayer film sandwiched between the first member for laminated glass and the second member for laminated glass. The interlayer film is the interlayer film for laminated glass according to the present invention.

10 Claims, 2 Drawing Sheets

(56) References Cited

FOREIGN PATENT DOCUMENTS

| | | |
|---|---|---|
| JP | 2008-24538 A | 2/2008 |
| JP | 2009-62411 A | 3/2009 |
| WO | WO-01/25162 A1 | 4/2001 |
| WO | WO-2009/093655 A1 | 7/2009 |

OTHER PUBLICATIONS

International Search Report for the Application No. PCT/JP2012/054437 mailed May 1, 2012.

Written Opinion of the International Searching Authority (PCT/ISA/237) for Application No. PCT/JP2012/054437 mailed May 1, 2012.

INTERMEDIATE FILM FOR LAMINATED GLASSES, AND LAMINATED GLASS

TECHNICAL FIELD

The present invention relates to an interlayer film for laminated glass which is used for laminated glass for vehicles, buildings, or the like. More specifically, the present invention relates to an interlayer film for laminated glass which can give high heat-shielding properties to laminated glass, and laminated glass including the interlayer film for laminated glass.

BACKGROUND ART

Laminated glass is safety glass which, even when broken by impact from the outside, shatters into few flying glass fragments. For this reason, laminated glass is widely used for applications such as cars, railcars, aircrafts, boats, ships, buildings, and the like. The laminated glass is produced by sandwiching an interlayer film for laminated glass between a pair of glass plates. Such laminated glass used for openings of vehicles or buildings are required to have high heat-shielding properties.

Infrared rays having a wavelength of 780 nm or longer, which is longer than a wavelength of visible light, have a small amount of energy compared to ultraviolet rays. The infrared rays, however, have a large thermal effect, and are emitted as heat when absorbed by a substance. For this reason, the infrared rays are commonly referred to as heat rays. Laminated glass is therefore required to sufficiently shield infrared rays so as to have better heat-shielding properties.

The following Patent Document 1 discloses an interlayer film containing tin-doped indium oxide particles (ITO particles) or antimony-doped tin oxide particles (ATO particles) as an interlayer film that effectively blocks the infrared rays (heat rays).

The following Patent Document 2 discloses an interlayer film containing a near-infrared absorbing coloring matter, an ultraviolet absorber having a maximum absorption wavelength in the wavelength range of 250 to 400 nm, and an ethylene-vinyl acetate copolymer. Examples of the near-infrared absorbing coloring matter include phthalocyanine compounds, naphthalocyanine compounds, aminium salt compounds, and anthraquinone compounds.

RELATED ART DOCUMENT

Patent Document

Patent Document 1: WO 2001/025162 A1
Patent Document 2: JP H07 (1995)-178861 A

SUMMARY OF THE INVENTION

Problems to be Solved by the Invention

ITO particles and ATO particles, however, do not absorb near-infrared rays sufficiently. For this reason, it is difficult to greatly increase the heat-shielding properties of laminated glass by simply adding ITO particles or ATO particles to an interlayer film as described in Patent Document 1.

It is also difficult to sufficiently increase the heat-shielding properties of laminated glass by adding a near-infrared absorbing coloring matter and an ultraviolet absorber to an interlayer film as described in Patent Document 2.

Laminated glass is also required to have a high visible transmittance as well as a low solar transmittance which is an index of heat-shielding properties. That is, laminated glass is required to have high heat-shielding properties while retaining a high visible transmittance.

However, it is very difficult to obtain laminated glass having a sufficiently low solar transmittance and a sufficiently high visible transmittance with use of the conventional interlayer films as described in Patent Documents 1 and 2. Laminated glass including a conventional interlayer film also has a problem that the visible transmittance thereof decreases when used for a long period of time.

The present invention aims to provide an interlayer film for laminated glass which enables production of laminated glass having a high visible transmittance and excellent heat-shielding properties, and can retain the high visible transmittance of the laminated glass for a long period of time; and laminated glass including the interlayer film for laminated glass.

Means for Solving the Problems

A broad aspect of the present invention is an interlayer film for laminated glass, including a first heat-shielding layer containing a thermoplastic resin and at least one component selected from a phthalocyanine compound, a naphthalocyanine compound, and an anthracocyanine compound, and at least one second heat-shielding layer containing a thermoplastic resin and metal oxide particles.

Since the interlayer film for laminated glass according to the present invention is provided with a first heat-shielding layer and at least one second heat-shielding layer, the interlayer film is a multi-layered interlayer film for laminated glass.

In a specific aspect of the interlayer film for laminated glass according to the present invention, the component contains vanadium atom(s).

In another specific aspect of the interlayer film for laminated glass according to the present invention, the component is at least one selected from phthalocyanine and phthalocyanine derivative.

In yet another specific aspect of the interlayer film for laminated glass according to the present invention, the metal oxide particles are tin-doped indium oxide particles or caesium-doped tungsten oxide particles.

In yet another specific aspect of the interlayer film for laminated glass according to the present invention, the metal oxide particles are tin-doped indium oxide particles.

In yet another specific aspect of the interlayer film for laminated glass according to the present invention, the thermoplastic resin included in the first heat-shielding layer and the thermoplastic resin included in the second heat-shielding layer each are a polyvinyl acetal resin.

In yet another specific aspect of the interlayer film for laminated glass according to the present invention, the first heat-shielding layer and the second heat-shielding layer each further contain a plasticizer.

In yet another specific aspect of the interlayer film for laminated glass according to the present invention, the second heat-shielding layer is laminated on a first surface of the first heat-shielding layer.

In yet another specific aspect of the interlayer film for laminated glass according to the present invention, one second heat-shielding layer is laminated on the first surface of the first heat-shielding layer, and another second heat-shielding layer is laminated on a second surface of the first heat-shielding layer which is on the opposite side of the first surface. In this case, the interlayer film for laminated glass according to the present invention has the first heat-shielding layer, the second heat-shielding layer laminated on the first surface of the first heat-shielding layer, and the second heat-shielding layer laminated on the second surface of the first heat-shielding layer.

The laminated glass of the present invention includes a first member for laminated glass, a second member for laminated glass, and an interlayer film sandwiched between the first member for laminated glass and the second member for laminated glass, wherein the interlayer film is the interlayer film for laminated glass according to the present invention.

Effect of the Invention

The interlayer film for laminated glass according to the present invention includes a first heat-shielding layer containing a thermoplastic resin and at least one component selected from a phthalocyanine compound, a naphthalocyanine compound, and an anthracocyanine compound, and at least one second heat-shielding layer containing a thermoplastic resin and metal oxide particles. The interlayer film therefore enables production of laminated glass having a high visible transmittance and excellent heat-shielding properties. The interlayer film also enables retention of the high visible transmittance of the obtained laminated glass for a long period of time.

MODE(S) FOR CARRYING OUT THE INVENTION

Hereinafter, the present invention will be described in detail.

(Interlayer Film for Laminated Glass)

Figure 1:
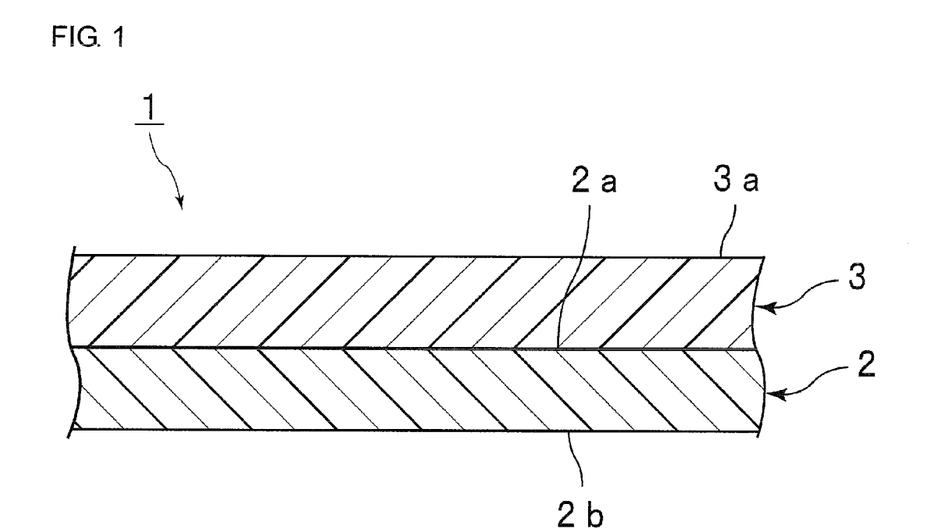
FIG. 1 is a partially cutout cross-sectional view illustrating an example of an interlayer film for laminated glass according to a first embodiment of the present invention.

FIG. 1 is a partially cutout cross-sectional view illustrating an example of an interlayer film for laminated glass according to a first embodiment of the present invention.

An interlayer film 1 illustrated in FIG. 1 is provided with a first heat-shielding layer 2 and a second heat-shielding layer 3 that is laminated on a first surface 2a (one surface) of the first heat-shielding layer 2.

Figure 2:
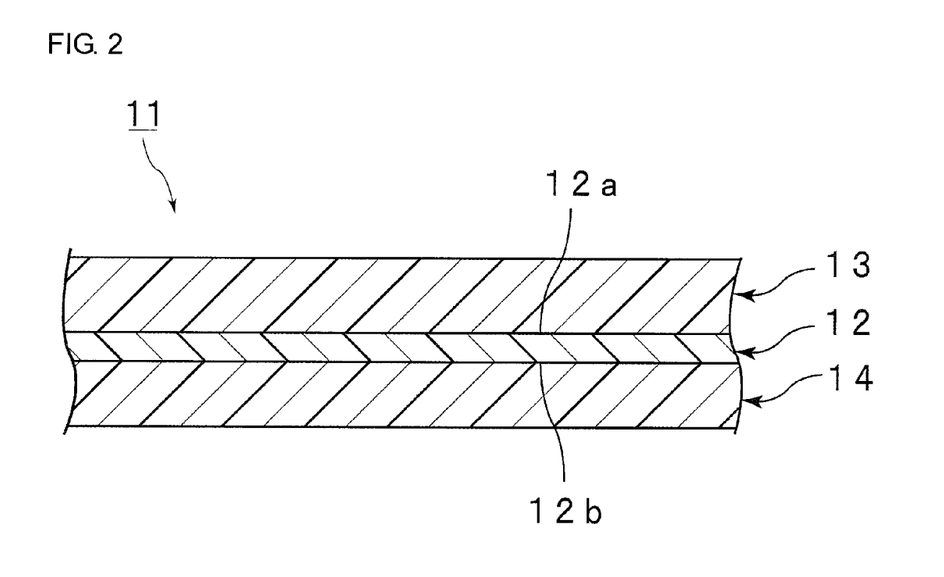
FIG. 2 is a partially cutout cross-sectional view illustrating an example of an interlayer film for laminated glass according to a second embodiment of the present invention.

FIG. 2 is a partially cutout cross-sectional view illustrating an example of an interlayer film for laminated glass according to a second embodiment of the present invention.

An interlayer film 11 illustrated in FIG. 2 is provided with a first heat-shielding layer 12, a second heat-shielding layer 13 laminated on a first surface 12a (one surface) of the first heat-shielding layer 12, and a second heat-shielding layer 14 laminated on a second surface 12b (the other surface) of the first heat-shielding layer 12 which is on the opposite side of the first surface 12a.

Figure 3:
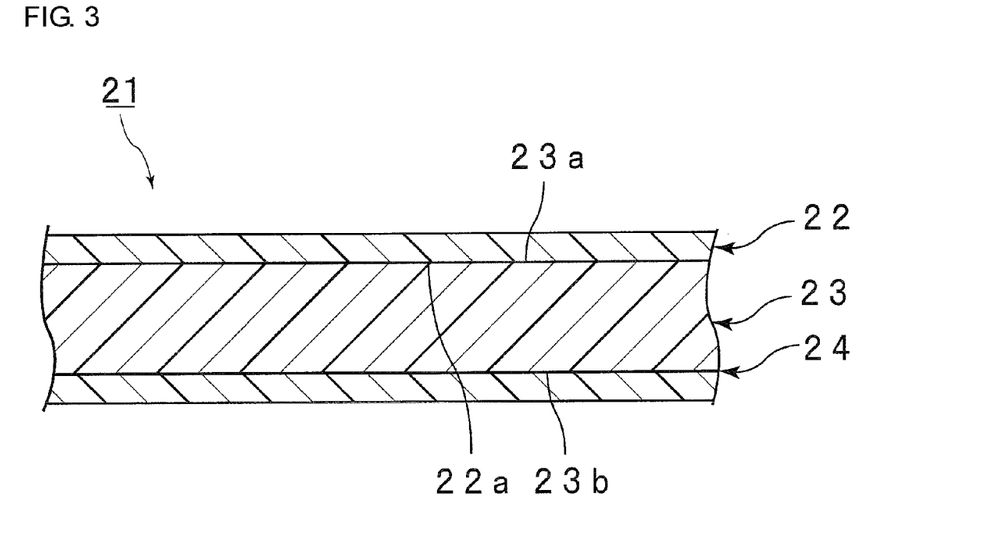
FIG. 3 is a partially cutout cross-sectional view illustrating an example of an interlayer film for laminated glass according to a third embodiment of the present invention.

FIG. 3 is a partially cutout cross-sectional view illustrating an interlayer film for laminated glass according to a third embodiment of the present invention.

An interlayer film 21 illustrated in FIG. 3 is provided with a first heat-shielding layer 22, a second heat-shielding layer 23 laminated on a first surface 22a (one surface) of the first heat-shielding layer 22, and a first heat-shielding layer 24 laminated on a second surface 23b (the other surface) of the second heat shielding layer 23, which is on the opposite side of a first surface 23a (one surface) of the second heat-shielding layer 23 where the first heat-shielding layer 22 is laminated.

The interlayer film 1, the interlayer film 11, and the interlayer film 21 each are used to obtain laminated glass. The interlayer films 1, the interlayer film 11, and the interlayer film 21 each are an interlayer film for laminated glass.

The first heat-shielding layer 2, the first heat-shielding layer 12, the first heat-shielding layer 22, and the first heat-shielding layer 24 each include a thermoplastic resin and at least one of one component selected from a phthalocyanine compound, a naphthalocyanine compound, and an anthracocyanine compound. Hereinafter, the at least one component selected from a phthalocyanine compound, a naphthalocyanine compound, and an anthracocyanine compound may also be referred to as a component X. The first heat-shielding layer 22 and the first heat-shielding layer 24 may be formed from the same material or may be formed from different materials, as long as they each contain a thermoplastic resin and the component X. That is, in the case that the interlayer film includes a plurality of the first heat-shielding layers, the plurality of the first heat-shielding layers may be formed from the same material, or may be formed from different materials.

The second heat-shielding layer 3, the second heat-shielding layer 13, the second heat-shielding layer 14, and the second heat-shielding layer 23 each include a thermoplastic resin and metal oxide particles. The second heat-shielding layer 3, the second heat-shielding layer 13, the second heat-shielding layer 14, and the second heat-shielding layer 23 may be formed from the same material or may be formed from different materials, as long as they each include a thermoplastic resin and metal oxide particles. That is, in the case that the interlayer film includes a plurality of the second heat-shielding layers, the plurality of the second heat-shielding layers may be formed from the same material or may be formed from different materials.

Use of an interlayer film for laminated glass which contains heat-shielding particles (e.g. ITO particles) so far has sometimes given low heat-shielding properties to the laminated glass, and unfortunately has not easily resulted in laminated glass having both a low solar irradiation rate and a high visible transmittance.

To solve the problem, the present embodiment mainly features the first heat-shielding layer 2, the first heat-shielding layer 12, the first heat-shielding layer 22, and the first heat-shielding layer 24 each including a thermoplastic resin and a component X, and the second heat-shielding layer 3, the second heat-shielding layer 13, the second heat-shielding layer 14, and the second heat-shielding layer 23 each including a thermoplastic resin and metal oxide particles.

The present inventors have found that both higher heat-shielding properties and higher visible transmittance can be given to laminated glass and an interlayer film for laminated glass when the component X and metal oxide particles are used in combination. As described above, combination use of the component X and metal oxide particles can sufficiently increase the heat-shielding properties of the interlayer film and the laminated glass, and can produce laminated glass with a low solar transmittance (an index of heat-shielding properties) and a high visible transmittance. For example, such an interlayer film can give a solar transmittance (Ts2500) of 65% or lower at a wavelength of 300 to 2500 nm, and a visible transmittance of 65% or higher to the laminated glass. Such an interlayer film can also give a solar transmittance (Ts2500) of 50% or lower, and a visible transmittance of 70% or higher.

The present inventors have also found that long-term use of laminated glass with an interlayer film that contains the component X and metal oxide particles in the same layer in the interlayer film decreases the visible transmittance. The present inventors have therefore made studies to suppress a decrease in the visible transmittance. As a result, they have found that, when the interlayer film for laminated glass is formed into a multi-layered interlayer film with two or more layers and the component X and the metal oxide particles are contained in different layers, the high visible transmittance of the laminated glass and the interlayer film for laminated glass can be retained for a long period of time. If the interlayer film is formed into a multi-layered interlayer film with two or more layers and the component X and the metal oxide particles are contained not in the same layer but in different layers, a chemical change of the component X in the first heat-shielding layer and deterioration of resins caused by the chemical change of the component X can be notably suppressed. For this reason, the high visible transmittance of the interlayer film and the laminated glass can be retained for a long period of time.

The present embodiment can also increase the transparency; for example, the present embodiment can give a haze value of 1% or lower, 0.5% or lower, or even 0.4% or lower.

The interlayer film 11 has a three-layered structure in which the second heat-shielding layer 13, the first heat-shielding layer 12, and the second heat-shielding layer 14 are laminated in the stated order. In this way, the first heat-shielding layer 12 may be disposed or sandwiched between two layers of the second heat-shielding layer 13 and the second heat-shielding layer 14. The interlayer film 21 has a three-layered structure in which the first heat-shielding layer 22, the second heat-shielding layer 23, and the first heat-shielding layer 24 are laminated in the stated order. In this way, the second heat-shielding layer 23 may be disposed or sandwiched between two layers of the first heat-shielding layer 22 and the first heat-shielding layer 24. In these cases, the interlayer film can be provided with the same or similar properties on both of its surfaces, and thus the interlayer film can have higher handleability.

As in the case of the interlayer film 1, the second heat-shielding layer 3 may be disposed or laminated only on the first surface 2a of the first heat-shielding layer 2. On the second surface of the first heat-shielding layer, other layer(s) different from the first heat-shielding layer may be disposed or laminated, other layer(s) different from the second heat-shielding layer may be disposed or laminated, and other layer(s) different from the first layer and the second layer may be disposed or laminated. On one surface or both surfaces of each of the interlayer film 1, the interlayer film 11, and the interlayer film 21, other layer(s) different from the first heat-shielding layer may be disposed or laminated, other layer(s) different from the second heat-shielding layer may be disposed or laminated, and other layer(s) different from the first layer and the second layer may be disposed or laminated. Also, between the first heat-shielding layer and the second heat-shielding layer, other layer(s) different from the first heat-shielding layer may be disposed or laminated, other layer(s) different from the second heat-shielding layer may be disposed or laminated, and other layer(s) different from the first layer and the second layer may be disposed or laminated. Examples of the above other layer(s) include layers containing an ultraviolet absorber.

Hereinafter, the materials constituting the above first heat-shielding layer and the above second heat-shielding layer will be described in detail.

(Thermoplastic Resin)

The first heat-shielding layer and the second heat-shielding layer each contain a thermoplastic resin. The thermoplastic resin is not particularly limited. The thermoplastic resin may be a conventionally known thermoplastic resin. One thermoplastic resin may be used alone, or two or more thermoplastic resins may be used in combination.

Examples of the thermoplastic resin include polyvinyl acetal resins, ethylene-vinyl acetate copolymer resins, ethylene-acrylic acid copolymer resins, polyurethane resins, and polyvinyl alcohol resins. Thermoplastic resins other than these may also be used.

The thermoplastic resins in the first heat-shielding layer and the second heat-shielding layer each are preferably a polyvinyl acetal resin. Use of a polyvinyl acetal resin can increase the compatibility between the first heat-shielding layer and the second heat-shielding layer, can further increase the adhesion between the first heat-shielding layer and the second heat-shielding layer, and can further increase the transparency of the interlayer film and the laminated glass.

The first heat-shielding layer and the second heat-shielding layer each preferably include the later-described plasticizer. If the thermoplastic resins contained in the first heat-shielding layer and the second heat-shielding layer each are a polyvinyl acetal resin, combination use of a polyvinyl acetal resin and a plasticizer can further increase the adhesion between the first heat-shielding layer and the second heat-shielding layer. As a result, the adhesion of the interlayer film for laminated glass according to the present invention to members for laminated glass can be further increased.

The above polyvinyl acetal resin can be produced by, for example, acetalizing a polyvinyl alcohol with an aldehyde. The above polyvinyl alcohol can be produced by, for example, saponifying polyvinyl acetate. The saponification degree of the polyvinyl alcohol is typically in the range from 70 to 99.9 mol %, and preferably in the range from 80 to 99.8 mol %.

The average polymerization degree of the polyvinyl alcohol is preferably 200 or higher, and more preferably 500 or higher, while it is preferably 3500 or lower, more preferably 3000 or lower, and still more preferably 2500 or lower. An average polymerization degree equal to the above lower limit or higher further increases the penetration resistance of the laminated glass. An average polymerization degree equal to the above upper limit or lower facilitates formation of the interlayer film.

The carbon number of the acetal group included in the polyvinyl acetal resin is not particularly limited. The aldehyde used in production of the polyvinyl acetal resin is not particularly limited. The carbon number of the acetal group in the polyvinyl acetal resin is preferably 3 or 4. A carbon number of the acetal group in the polyvinyl acetal resin of 3 or greater sufficiently decreases the glass transition temperature of the interlayer film.

The aldehyde is not particularly limited. Typically, a C1 to C10 aldehyde can be suitably used. Examples of the C1 to C10 aldehyde include propionaldehyde, n-butyraldehyde, isobutyraldehyde, n-valeraldehyde, 2-ethylbutyraldehyde, n-hexyl aldehyde, n-octyl aldehyde, n-nonyl aldehyde, n-decyl aldehyde, formaldehyde, acetaldehyde, and benzaldehyde. Particularly, propionaldehyde, n-butyraldehyde, isobutyraldehyde, n-hexyl aldehyde, and n-valeraldehyde are preferred, propionaldehyde, n-butyraldehyde, and isobutyraldehyde are more preferred, and n-butyraldehyde is still more preferred. One aldehyde may be used alone, or two or more aldehydes may be used in combination.

The hydroxy group content (amount of hydroxy groups) of the polyvinyl acetal resin is preferably 15 mol % or higher, more preferably 18 mol % or higher, and still more preferably 20 mol % or higher, while it is preferably 40 mol % or lower, more preferably 35 mol % or lower, and still more preferably 32 mol % or lower. A hydroxy group content equal to the above lower limit or higher further increases the adhesion of each layer. A hydroxy group content equal to the above upper limit or lower increases the flexibility of the interlayer film, which allows easy handling of the interlayer film.

The hydroxy group content of the polyvinyl acetal resin is a value of a mol fraction in percentage (mol %) which is obtained by division of the amount of ethylene groups bonded with hydroxy groups by the total amount of ethylene groups of the main chain. The amount of ethylene groups bonded with hydroxy groups, for example, is determined by measurement in conformity with JIS K6726 "Testing methods for polyvinyl alcohol".

The acetylation degree (amount of acetyl groups) of the polyvinyl acetal resin is preferably 0.1 mol % or higher, more preferably 0.3 mol % or higher, and still more preferably 0.5 mol % or higher, while it is preferably 30 mol % or lower, more preferably 25 mol % or lower, still more preferably 20 mol % or lower, and particularly preferably 15 mol % or lower. An acetylation degree equal to the above lower limit or higher results in high compatibility between the polyvinyl acetal resin and the plasticizer. An acetylation degree equal to the above upper limit or lower results in high moisture resistance of the interlayer film and the laminated glass.

The acetylation degree is obtained below. The amount of ethylene groups bonded with the acetal group and the amount of the ethylene groups bonded with the hydroxyl group are subtracted from the total amount of ethylene groups in the main chain. The obtained value is divided by the total amount of ethylene groups in the main chain. The obtained mole fraction expressed as percentage is the acetylation degree. The amount of the ethylene groups bonded with acetal groups, for example, is determined by measurement in conformity with JIS K6728 "Testing methods for polyvinyl butyral".

The acetalization degree (butyralization degree in the case of a polyvinyl butyral resin) of the polyvinyl acetal resin is preferably 60 mol % or higher, and more preferably 63 mol % or higher, while it is preferably 85 mol % or lower, more preferably 75 mol % or lower, and still more preferably 70 mol % or lower. An acetalization degree equal to the above lower limit or higher results in high compatibility between the polyvinyl acetal resin and the plasticizer. An acetalization degree equal to the above upper limit or lower shortens the reaction time it takes to produce a polyvinyl acetal resin.

The acetalization degree is a mole percentage calculated from a mole fraction determined by dividing the amount of ethylene groups having an acetal group bonded thereto by the total amount of ethylene groups in the main chain.

The acetalization degree can be calculated by determining the acetylation degree and the hydroxy group content in mole percentages using the methods based on JIS K 6728 "Testing Methods for Polyvinyl Butyral", and subtracting the acetylation degree and the hydroxy group content from 100 mol %.

The hydroxy group content (amount of hydroxy groups), the acetalization degree (butyralization degree), and the acetylation degree are preferably calculated from the results obtained by the methods based on JIS K 6728 "Testing Methods for Polyvinyl Butyral". In the case that the polyvinyl acetal resin is a polyvinyl butyral resin, the hydroxy group content (amount of hydroxy groups), the acetalization degree (butyralization degree), and the acetylation degree can be calculated from the results obtained by the methods based on JIS K 6728 "Testing Methods for Polyvinyl Butyral".

(Plasticizer)

In terms of a further increase in the adhesion of each layer, the first heat-shielding layer and the second heat-shielding layer each preferably include a plasticizer. Particularly in the case that the thermoplastic resins contained in the first heat-shielding layer and the second heat-shielding layer each are a polyvinyl acetal resin, the first heat-shielding layer and the second heat-shielding layer each preferably include a plasticizer.

The plasticizer is not particularly limited, and may be a conventionally known plasticizer. One plasticizer may be used alone, or two or more plasticizers may be used in combination.

Examples of the plasticizer include organic ester plasticizers such as monobasic organic acid esters and polybasic organic acid esters, and phosphoric acid plasticizers such as organic phosphoric acid plasticizers and organic phosphorous acid plasticizers. Particularly, organic ester plasticizers are preferred. The plasticizer is preferably a liquid plasticizer.

Examples of the monobasic organic acid esters include, but not particularly limited to, glycol esters obtained by the reaction between a glycol and a monobasic organic acid, and esters of a monobasic organic acid and triethylene glycol or tripropylene glycol. Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octylic acid, 2-ethylhexanoic acid, n-nonylic acid, and decylic acid.

Examples of the polybasic organic acid esters include, but not particularly limited to, ester compounds of polybasic organic acids and C4 to C8 linear or branched alcohols. Examples of the polybasic organic acid include adipic acid, sebacic acid, and azelaic acid.

Examples of the organic ester plasticizers include, but not particularly limited to, triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctylazelate, dibutylcarbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, a mixture of heptyl adipate and nonyl adipate, diisononyl adipate, diisodecyl adipate, heptylnonyl adipate, dibutyl sebacate, oil-modified alkyd sebacate, and a mixture of a phosphoric acid ester and an adipic acid ester. Organic ester plasticizers other than these may also be used.

Examples of the organic phosphoric acid plasticizer include, but not particularly limited to, tributoxyethyl phosphate, isodecyl phenyl phosphate, and triisopropyl phosphate.

The plasticizer is preferably a diester plasticizer represented by the following formula (I).

[Chem. 1]

Formula (1)

In the above formula (I), R1 and R2 each represent a C2 to C10 organic group, R3 represents an ethylene group, an isopropylene group, or an n-propylene group, and p represents an integer of 3 to 10. In the above formula (I), R1 and R2 each are preferably a C5 to C10 organic group, and more preferably a C6 to C10 organic group.

The plasticizer preferably includes at least one selected from triethylene glycol di-2-ethylhexanoate (3GO), triethylene glycol di-2-ethylbutyrate (3 GH), and triethylene glycol di-2-ethylpropanoate, more preferably at least one selected from triethylene glycol di-2-ethylhexanoate and triethylene glycol di-2-ethylbutyrate, and still more preferably triethylene glycol di-2-ethylhexanoate. It is also preferred that the plasticizer include triethylene glycol di-2-ethylpropanoate.

The amounts of the respective plasticizers in the first heat-shielding layer and the second heat-shielding layer are not particularly limited. For each 100 parts by weight of the thermoplastic resin in each of the first heat-shielding layer and the second heat-shielding layer, the amount of each plasticizer is preferably 25 parts by weight or more, more preferably 30 parts by weight or more, and still more preferably 35 parts by weight or more, while it is preferably 75 parts by weight or less, more preferably 60 parts by weight or less, and still more preferably 50 parts by weight or less. An amount of the plasticizer equal to the above lower limit or more can further increase the penetration resistance of the laminated glass. An amount of the plasticizer equal to the above upper limit or less can further increase the transparency of the interlayer film.

The absolute value of a difference between the amount of the plasticizer in the first heat-shielding layer and the amount of the plasticizer in the second heat-shielding layer is preferably 5 parts by weight or more, more preferably 10 parts by weight or more, still more preferably 12 parts by weight or more, and particularly preferably 15 parts by weight or more. The absolute value of a difference between the amount of the plasticizer in the first heat-shielding layer and the amount of the plasticizer in the second heat-shielding layer is preferably 40 parts by weight or less, more preferably 35 parts by weight or less, and still more preferably 30 parts by weight or less. An absolute value of a difference between the amounts equal to the above lower limit or more further increases the sound insulation of the laminated glass, while an absolute value equal to the above upper limit or less further increases the penetration resistance of the laminated glass.

(Component X)

The first heat-shielding layer contains the above component X. The component X is at least one component selected from a phthalocyanine compound, a naphthalocyanine compound, and an anthracocyanine compound. The component X is a heat-shielding component. Combination use of the metal oxide particles and the component X in the entire interlayer film enables sufficient shielding infrared rays (heat rays).

The component X is not particularly limited. For the component X, conventionally known phthalocyanine compound, naphthalocyanine compound, and anthracyanine compound can be used. One compound may be used alone, or two or more compounds may be used in combination for the component X.

Examples of the component X include phthalocyanine, phthalocyanine derivative, naphthalocyanine, naphthalocyanine derivative, anthracyanine, and anthracyanine derivative. Each of the phthalocyanine compound and the phthalocyanine derivative preferably has a phthalocyanine skeleton. Each of the naphthalocyanine compound and the naphthalocyanine derivative preferably has a naphthalocyanine skeleton. Each of the anthracyanine compound and the anthracyanine derivative preferably has an anthracyanine skeleton.

For a further increase in the heat-shielding properties of the interlayer film and the laminated glass, the component X is preferably at least one selected from the group consisting of phthalocyanine, phthalocyanine derivative, naphthalocyanine, and naphthalocyanine derivative, and is more preferably at least one selected from phthalocyanine and phthalocyanine derivative.

For an effective increase in the heat-shielding properties and long-term retention of the visible transmittance at a higher level, the component X preferably contains vanadium atom(s) or copper atom(s), and more preferably contains vanadium atom(s). The component X is more preferably at least one selected from phthalocyanine containing vanadium atom(s) or copper atom(s), and phthalocyanine derivatives containing vanadium atom(s) or copper atom(s). For a further increase in the heat-shielding properties of the interlayer film and the laminated glass, the component X preferably has a structural unit having an oxygen atom bonded to a vanadium atom.

The amount of the component X in the first heat-shielding layer is not particularly limited. In 100% by weight of the first heat-shielding layer, the amount of the component X is preferably 0.001% by weight or more, more preferably 0.003% by weight or more, still more preferably 0.005% by weight or more, and particularly preferably 0.01% by weight or more, while it is preferably 0.2% by weight or less, more preferably 0.15% by weight or less, still more preferably 0.1% by weight or less, and particularly preferably 0.05% by weight or less. An amount of the component X in the first heat-shielding layer in the above range from the lower limit to the upper limit can sufficiently increase the heat-shielding properties, sufficiently decrease the solar transmittance (Ts2500), and sufficiently increase the visible transmittance. For example, such an amount can give a visible transmittance of 70% or higher.

The second heat-shielding layer may or may not include the component X. Still, for suppression of deterioration of the component X in the second heat-shielding layer, a smaller amount of the component X in the second heat-shielding layer is better, and preferably, the second heat-shielding layer does not include the component X. Here, even when the component X in the second heat-shielding layer is deteriorated, a chemical change of the component X and deterioration of resins caused by the chemical change of the component X in the first heat-shielding layer can be suppressed, since the component X also included in the first heat-shielding layer.

If the second heat-shielding layer includes the component X, the amount X2 (% by weight) of the component X in the second heat-shielding layer is preferably less than the amount X1 (% by weight) of the component X in the first heat-shielding layer. The amount X2 of the component X is preferably 90% or lower, more preferably 70% or lower, still more preferably 50% or lower, particularly preferably 30% or lower, and most preferably 10% or lower of the amount X1 of the component X. A smaller amount of the component X in the second heat-shielding layer can more effectively suppress a chemical change of the component X and deterioration of resins caused by the chemical change of the component X in the second heat-shielding layer.

(Metal Oxide Particles)

The second heat-shielding layer includes metal oxide particles. The metal oxide particles are not particularly limited as long as they are particles formed from oxides of metals. One kind of metal oxide particles may be used alone, or two or more kinds of metal oxide particles may be used in combination.

Infrared rays having a wavelength of 780 nm or longer, which is longer than a wavelength of visible light, have a small amount of energy compared to ultraviolet rays. Infrared rays, however, have a large thermal effect, and are emitted as heat once absorbed by a substance. For this reason, infrared rays are commonly referred to as heat rays. Use of the metal oxide particles enables effective shielding infrared rays (heat rays).

Specific examples of the metal oxide particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, caesium-doped tungsten oxide particles, thallium-doped tungstic oxide particles, rubidium-doped tungsten oxide particles, tin-doped indium oxide particles (ITO particles), tin-doped zinc oxide particles, and silicon-doped zinc oxide particles. Among these, ATO particles, GZO particles, ITO particles, and caesium-doped tungsten oxide particles are preferred, ITO particles and caesium-doped tungsten oxide particles are more preferred, and ITO particles are still more preferred, for their high heat-ray shielding properties. Also, caesium-doped tungsten oxide particles are preferred.

The average particle size of the metal oxide particles is preferably 0.01 μm or larger, and more preferably 0.02 μm or larger, while it is preferably 100 μm or smaller, and more preferably 50 μm or smaller. An average particle size equal to the above lower limit or larger can sufficiently increase the heat-ray shielding properties. An average particle size equal to the above upper limit or smaller can increase the dispersibility of the metal oxide particles.

The above term "average particle size" means a volume-average particle size. The average particle size can be measured using a device such as a particle size distribution measuring device ("UPA-EX 150" produced by Nikkiso Co., Ltd.).

The amount of the metal oxide particles in the second heat-shielding layer is not particularly limited. In 100% by weight of the second heat-shielding layer, the amount of the metal oxide particles is preferably 0.01% by weight or more, more preferably 0.1% by weight or more, still more preferably 0.15% by weight or more, and particularly preferably 0.2% by weight or more, while it is preferably 3% by weight or less, more preferably 1% by weight or less, and still more preferably 0.8% by weight or less. An amount of the metal oxide particles in the second heat-shielding layer in the above range from the lower limit to the upper limit can sufficiently increase the heat-shielding properties, sufficiently decrease the solar transmittance (Ts2500), and sufficiently increase the visible transmittance. For example, such an amount can give a visible transmittance of 70% or higher.

The first heat-shielding layer may or may not include metal oxide particles. Still, for suppression of deterioration of the component X in the first heat-shielding layer, a smaller amount of the metal oxide particles in the first heat-shielding layer is better, and preferably, the first heat-shielding layer does not include metal oxide particles.

If the first heat-shielding layer includes the metal oxide particles, the amount A1 (% by weight) of the metal oxide particles in the first heat-shielding layer is preferably less than the amount A2 (% by weight) of the metal oxide particles in the second heat-shielding layer. The amount A1 of the metal oxide particles is preferably 90% or less, more preferably 70% or less, still more preferably 50% or less, particularly preferably 30% or less, and most preferably 10% or less of the amount A2 of the metal oxide particles. A smaller amount of the metal oxide particles in the first heat-shielding layer can more effectively suppress a chemical change of the component X and deterioration of resins caused by the chemical change of the component X in the first heat-shielding layer.

(Other Components)

The first heat-shielding layer and the second heat-shielding layer may each optionally contain additives such as an ultraviolet shielding agent (e.g. ultraviolet absorber), an antioxidant, a light stabilizer, a flame retardant, an antistatic agent, a pigment, a dye, an adhesion adjuster, a moisture resistance agent, a fluorescent brightener, and an infrared absorber. Each of these additives may be used alone, or two or more of these may be used in combination.

The first heat-shielding layer and the second heat-shielding layer each preferably include an ultraviolet shielding agent. The first heat-shielding layer and the second heat-shielding layer each preferably include an ultraviolet absorber as the ultraviolet shielding agent. Examples of the ultraviolet shielding agent include a metal ultraviolet shielding agent, a metal oxide ultraviolet shielding agent, a benzotriazol compound, a benzophenone compound, a triazine compound, and a benzoate compound.

The amount of the ultraviolet shielding agent is not particularly limited. For further suppression of a decrease in the visible transmittance over time, the amount of the ultraviolet shielding agent in 100% by weight of each of the first heat-shielding layer and the second heat-shielding layer is preferably 0.1% by weight or more, more preferably 0.2% by weight or more, still more preferably 0.3% by weight or more, and particularly preferably 0.5% by weight or more, while it is preferably 2.5% by weight or less, more preferably 2% by weight or less, still more preferably 1% by weight or less, and particularly preferably 0.8% by weight or less. Particularly when the amount of the ultraviolet shielding agent in 100% by weight of each of the first heat-shielding layer and the second heat-shielding layer is 0.2% by weight or more, a decrease in the visible transmittance of the interlayer film and the laminated glass over time can be notably suppressed.

The first heat-shielding layer and the second heat-shielding layer each preferably include an antioxidant. Examples of the antioxidant include phenolic antioxidants, sulfuric antioxidants, and phosphoric antioxidants. The phenolic antioxidants are antioxidants with a phenol skeleton. The sulfuric antioxidants are antioxidants containing sulfur atom(s). The phosphoric antioxidants are antioxidants containing phosphorus atom(s).

For a further increase in the heat-shielding properties and visible transmittance of the interlayer film and the laminated glass and in the visible transmittance of the interlayer film and the laminated glass over time, the amount of the antioxidant in 100% by weight of each of the first heat-shielding layer and the second heat-shielding layer is more preferably 0.15% by weight or more, and still more preferably 0.2% by weight or more. For prevention of the yellowing of the interlayer film, the amount of the antioxidant in 100% by weight of each of the first heat-shielding layer and the second heat-shielding layer is more preferably 2% by weight or less, and still more preferably 1.5% by weight or less.

The first heat-shielding layer and the second heat-shielding layer each preferably include an adhesion modifier. The first heat-shielding layer and the second heat-shielding layer each preferably include at least one metal salt selected from an alkali metal salt and an alkaline earth metal salt. The alkali metal salt and the alkaline earth metal salt can each be used as an adhesion modifier.

The metal salt preferably includes at least one metal selected from the group consisting of Li, Na, K, Rb, Cs, Mg, Ca, Sr, and Ba. The metal salt is preferably in the form of metal ions, hydrated metal ions, complexed metal ions, metal inorganic salts, or organic acid esters in the layers of the interlayer film. If the metal salt is in the form of metal ions, hydrated metal ions, or complexed metal ions, the adhesion between the members for laminated glass and the interlayer film or between the layers of the interlayer film can be easily controlled. The metal salt in the layers of the interlayer film preferably contains at least one metal selected from K and Mg.

The metal salt is more preferably an alkali metal salt of a C2 to C16 organic acid or an alkaline earth metal salt of a C2 to C16 organic acid, and still more preferably a magnesium salt of a C2 to C16 carboxylic acid or a potassium salt of a C2 to C16 carboxylic acid.

The magnesium salt of a C2 to C16 carboxylic acid and the potassium salt of a C2 to C16 carboxylic acid are not particularly limited. Examples thereof include magnesium acetate, potassium acetate, magnesium propionate, potassium propionate, magnesium 2-ethylbutanoate, potassium 2-ethylbutanoate, magnesium 2-ethylhexanoate, and potassium 2-ethylhexanoate.

The amount of the metal salt in each of the first heat-shielding layer and the second heat-shielding layer in terms of the amount of metal ions (e.g. magnesium concentration in the case of magnesium ions, and potassium concentration in the case of potassium ions) is preferably 5 ppm or more, more preferably 10 ppm or more, and still more preferably 20 ppm or more, while it is preferably 300 ppm or less, more preferably 250 ppm or less, and still more preferably 200 ppm or less. An amount of the metal salt in the above range from the lower limit to the upper limit can provide even better control of the adhesion between the members for laminated glass and the interlayer film or between the layers of the interlayer film. An amount of the metal salt equal to the above lower limit or more can further increase the light resistance of the interlayer film, and enables the high visible transmittance to be retained for a longer period of time.

(Interlayer Film for Laminated Glass)

The thickness of the interlayer film is not particularly limited. The thickness of the interlayer film refers to the total thickness of the layers constituting the interlayer film. For example, in the case of the interlayer film 1, the thickness of the interlayer film 1 refers to the total thickness of the first heat-shielding layer 2 and the second heat-shielding layer 3. In terms of the practicality and a sufficient increase in the heat-shielding properties, the thickness of the interlayer film is preferably 0.1 mm or larger, and more preferably 0.25 mm or larger, while it is preferably 3 mm or smaller, and more preferably 1.5 mm or smaller. A thickness of the interlayer film equal to the above lower limit or larger leads to high penetration resistance of the laminated glass.

In terms of the practicality and a sufficient increase in the heat-shielding properties, the thickness of the first heat-shielding layer is preferably 0.001 mm or larger, and more preferably 0.2 mm or larger, while it is preferably 0.8 mm or smaller, and more preferably 0.6 mm or smaller. In the case that the interlayer film includes a plurality of the first heat-shielding layers, the above term "thickness of the first heat-shielding layer" refers to the total thickness of the plurality of the first heat-shielding layers.

In terms of the practicality and a sufficient increase in the heat-shielding properties, the thickness of the second heat-shielding layer is preferably 0.001 mm or larger, more preferably 0.05 mm or larger, and still more preferably 0.2 mm or larger, while it is preferably 0.8 mm or smaller, and more preferably 0.6 mm or smaller. In the case that the interlayer film includes a plurality of the second heat-shielding layers, the above term "thickness of the second heat-shielding layer" refers to the total thickness of the plurality of the second heat-shielding layers.

The method for producing the interlayer film for laminated glass according to the present invention is not particularly limited. The method for producing the interlayer film can be a conventionally known method. Examples of the method include a production method that includes kneading a thermoplastic resin and components such as metal oxide particles or the component X, and molding an interlayer film. A production method with extrusion molding is preferred because the method is suitable for continuous production.

The kneading method is not particularly limited. Examples of the method include methods using an extruder, a plastograph, a kneader, a Banbury mixer, or a calender roll. Particularly, methods using an extruder are preferred because such methods are suitable for continuous production, and methods using a twin-screw extruder are more preferred. The interlayer film for laminated glass according to the present invention may be formed into a multi-layered interlayer film by separately producing the first heat-shielding layer and the second heat-shielding layer, and by laminating the first heat-shielding layer and the second heat-shielding layer. Alternatively, the interlayer film may be formed into a multi-layered interlayer film by laminating the first heat-shielding layer and the second heat-shielding layer by co-extrusion.

(Laminated Glass)

The interlayer film for laminated glass according to the present invention is used to obtain laminated glass.

Figure 4:
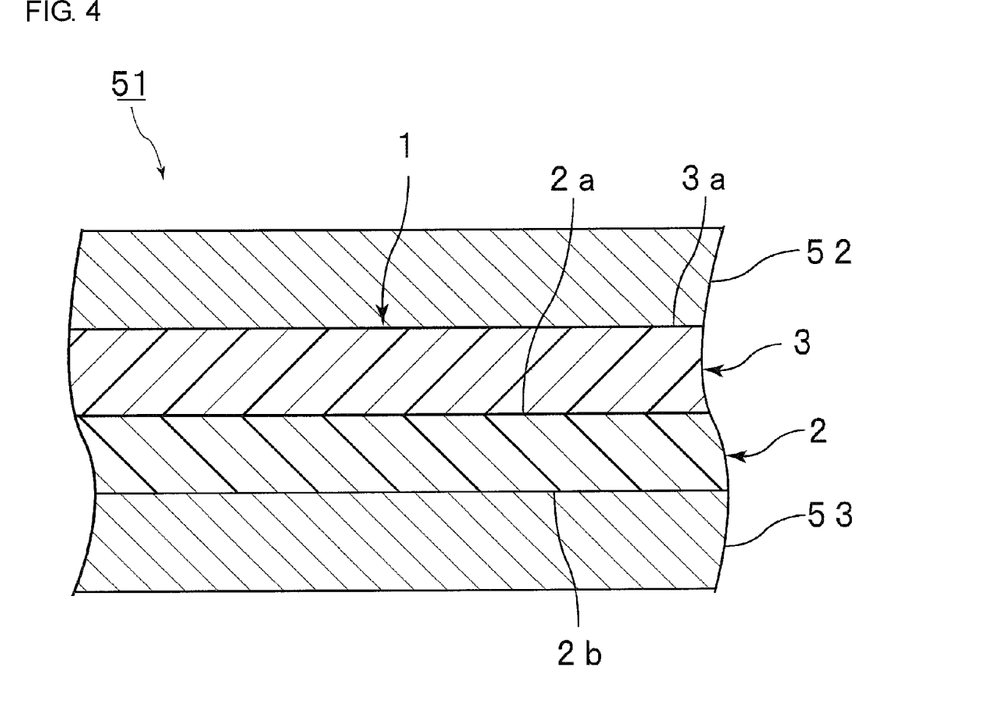
FIG. 4 is a partially cutout cross-sectional view illustrating an example of laminated glass including the interlayer film for laminated glass illustrated in FIG. 1.

FIG. 4 illustrates an example of laminated glass including the interlayer film 1 illustrated in FIG. 1.

Laminated glass 51 illustrated in FIG. 4 is provided with the interlayer film 1, a first member for laminated glass 52 and a second member for laminated glass 53. The interlayer film 1 is an interlayer film for laminated glass. The interlayer film 1 is sandwiched between the first member for laminated glass 52 and the second member for laminated glass 53. Therefore, the laminated glass 51 has a structure in which the first member for laminated glass 52, the interlayer film 1, and the second member for laminated glass 53 are laminated in the stated order. The first member for laminated glass 52 is laminated on an outer surface 3a of the second heat-shielding layer 3. The second member for laminated glass 53 is laminated on a second surface 2b of the first heat-shielding layer 2 which is on the outer side.

Examples of the first member for laminated glass and the second member for laminated glass include glass plates and PET (polyethylene terephthalate) films. The laminated glass encompasses not only laminated glass with an interlayer film sandwiched between two glass plates, but also laminated glass with an interlayer film sandwiched between a glass plate and a PET film or the like. That is, the laminated glass is preferably a laminate including at least one glass plate.

Examples of the glass plate include inorganic glass plates and organic glass plates. Examples of the inorganic glass include float plate glass, heat absorbing glass, heat reflecting glass, polished plate glass, molded plate glass, meshed plate glass, wired plate glass, and green glass. The organic glass is synthetic resin glass that can be substituted for inorganic glass. Examples of the organic glass plates include polycarbonate plates and poly(meth)acrylic resin plates. Examples of the poly(meth)acrylic resin plates include polymethyl (meth) acrylate plates.

The thickness of each of the members for laminated glass is not particularly limited, and is preferably 1 mm or larger, while it is preferably 5 mm or smaller, and more preferably 3 mm or smaller. In the case that the member for laminated glass is a glass plate, the thickness of the glass plate is preferably 1 mm or larger, while it is preferably 5 mm or smaller, and more preferably 3 mm or smaller. In the case that the member for laminated glass is a PET film, the thickness of the PET film is preferably 0.03 mm or larger, while it is preferably 0.5 mm or smaller.

The production method of the laminated glass is not particularly limited. For example, an interlayer film is sandwiched between the first member for laminated glass and the second member for laminated glass, and the resulting product is pressed by a pressing roll or vacuumed under reduced pressure in a rubber bag so that the air remaining between the first member for laminated glass and the second member for laminated glass and the interlayer film is removed. Thereafter, the components are preliminarily adhered at about 70 to 110° C. to obtain a laminate. Next, the laminate is put in an autoclave or is pressed so that the laminate is pressure-bonded at about 120 to 150° C. under a pressure of 1 to 1.5 MPa. Thereby, laminated glass can be obtained. At the same time with the production of laminated glass, the first heat-shielding layer and the second heat-shielding layer may be laminated to be formed into an interlayer film.

The interlayer film and the laminated glass can be used for cars, railcars, aircrafts, boats and ships, and buildings. The interlayer film and the laminated glass can also be used for other uses. The interlayer film and the laminated glass each are preferably used for laminated glass for vehicles or buildings, and more preferably laminated glass for vehicles. The interlayer film and the laminated glass can be used for windshields, side glass, rear glass, roof glass, or the like of cars. Since the interlayer film and the laminated glass have a low solar transmittance and a high visible transmittance, the interlayer film and the laminated glass are suitable for cars.

The visible transmittance of the laminated glass is preferably 65% or higher, and more preferably 70% or higher. The visible transmittance of the laminated glass can be determined in accordance with JIS R3211 (1998). The solar transmittance (Ts2500) of the laminated glass is preferably 65% or lower, and more preferably 50% or lower. The solar irradiation rate of the laminated glass can be measured in accordance with JIS R 3106 (1998). The haze value of the laminated glass is preferably 1% or lower, more preferably 0.5% or lower, and still more preferably 0.4% or lower. The haze value of the laminated glass can be measured in accordance with JIS K 6714.

Hereinafter, the present invention will be described in more detail based on examples. The present invention, however, is not limited to the following examples.

The following materials were used in the examples and comparative examples.

Thermoplastic Resin:
Resin A (polyvinyl butyral resin, polyvinyl butyral resin acetalized with n-butyraldehyde, average polymerization degree: 1700, hydroxy group content: 30.5 mol %, acetylation degree: 1 mol %, butyralization degree: 68.5 mol %)

Resin B (polyvinyl butyral resin, polyvinyl butyral resin acetalized with n-butyraldehyde, average polymerization degree: 2300, hydroxy group content: 22 mol %, acetylation degree: 13 mol %, butyralization degree: 65 mol %)

Plasticizer:
3GO (triethylene glycol di-2-ethylhexanoate)

Metal Oxide Particles:
ITO (ITO particles, Mitsubishi Materials Corporation)
CWO (caesium-doped tungsten oxide particles $Cs_{0.33}WO_3$)

Component X:
IR-906 (vanadyl phthalocyanine with a structural unit having an oxygen atom bonded to a vanadium atom, "EXCOLOR 906" produced by NIPPON SHOKUBAI CO., LTD.)

IR-915 (vanadyl phthalocyanine with an oxygen atom bonded to a vanadium atom, "EXCOLOR 915" produced by NIPPON SHOKUBAI CO., LTD.)

NIR-43V ("NIR-43V" produced by Yamada Chemical Co., Ltd.)

Other Components:
UVA (ultraviolet absorber, "Tinuvin 326" produced by BASF A.G.)
BHT (antioxidant, 2,6-di-t-butyl-p-cresol)
Metal salt A (magnesium bis(2-ethylbutyrate))

Example 1

(1) Production of First Heat-Shielding Layer

Triethylene glycol di-2-ethylhexanoate (3GO, 40 parts by weight), IR-906 (in an amount corresponding to 0.032% by weight in 100% by weight of the first heat-shielding layer to be obtained), UVA (1 part by weight), and BHT (1 part by weight) were mixed in a horizontal microbead mill, so that a dispersion was obtained.

The whole amount of the dispersion was added to 100 parts by weight of the resin A (polyvinyl butyral resin), and the mixture was sufficiently kneaded using a mixing mill. Thereby, a first composition was obtained.

The obtained first composition was sandwiched with clearance plates (having the same thickness as the first heat-shielding layer to be obtained) between two fluororesin sheets, and they were press-molded at 150° C. for 30 minutes such that a 380-μm-thick first heat-shielding layer was produced.

(2) Production of Second Heat-Shielding Layer

Triethylene glycol di-2-ethylhexanoate (3GO, 40 parts by weight), ITO particles (in an amount corresponding to 0.40% by weight in 100% by weight of the second heat-shielding layer to be obtained), UVA (1 part by weight), and BHT (1 part by weight) were mixed in a horizontal microbead mill, so that a dispersion was obtained. The volume-average particle size of the ITO particles in the dispersion was 35 nm.

The whole amount of the dispersion was added to 100 parts by weight of the resin A (polyvinyl butyral resin), and the mixture was sufficiently kneaded using a mixing mill. Thereby, a second composition was obtained.

The obtained second composition was sandwiched with clearance plates (having the same thickness as the second heat-shielding layer to be obtained) between two fluororesin sheets, and they were press-molded at 150° C. for 30 minutes such that a 380-μm-thick second heat-shielding layer was produced.

(3) Production of Interlayer Film for Laminated Glass

The obtained first heat-shielding layer and second heat-shielding layer were laminated to give a laminate of the first heat-shielding layer/the second heat-shielding layer. The obtained laminate was sandwiched with clearance plates (having the same thickness as the interlayer film to be obtained) between two fluororesin sheets, and they were press-molded at 150° C. for 30 minutes such that a 760-μm-thick interlayer film was produced.

(4) Production of Laminated Glass

The obtained interlayer film was cut into a size of 30 cm in length×30 cm in width. The obtained interlayer film was sandwiched between two transparent glass plates (30 cm in length×30 cm in width×2.5 mm in thickness). The product was retained in a vacuum laminator at 90° C. for 30 minutes and then vacuum-pressed, so that a laminate was obtained. The portion of the interlayer film protruding out of the glass plates was cut off, whereby laminated glass was obtained.

Examples 2 to 4

A first heat-shielding layer and a second heat-shielding layer were produced in the same manner as in Example 1, except that the kinds and amounts of the thermoplastic resin, plasticizer, metal oxide particles, and component X were set to those shown in Table 1. For the first heat-shielding layer and the second heat-shielding layer in Examples 2 to 4, the amount used of UVA was 1 part by weight and the amount used of BHT was 1 part by weight, for each 100 parts by weight of the thermoplastic resin. Using the obtained first heat-shielding layer and second heat-shielding layer, laminated glass including two interlayer films was produced in the same manner as in Example 1.

Examples 5 to 8

(1) Production of a First Heat-Shielding Layer and Second Heat-Shielding Layers A first heat-shielding layer and second heat-shielding layers were produced in the same manner as in Example 1, except that the kinds and amounts of the thermoplastic resin, the plasticizer, the metal oxide particles, and the component X for the first heat-shielding layer and the second heat-shielding layers were set to those shown in the following Table 1, and that the thickness of each layer in the first heat-shielding layer and the second heat-shielding layers was changed to that shown in the following Table 1.

The obtained second heat-shielding layer, first heat-shielding layer, and second heat-shielding layer were laminated in the stated order to give a laminate of the second heat-shielding layer/the first heat-shielding layer/the second heat-shielding layer. The obtained laminate was sandwiched with clearance plates (having the same thickness as the interlayer film to be obtained) between two fluororesin sheets, and they were press-molded at 150° C. for 30 minutes such that an 800-μm-thick interlayer film was produced.

Using the obtained interlayer film, laminated glass including a three-layered interlayer film was obtained in the same manner as in Example 1.

Comparative Example 1

Triethylene glycol di-2-ethylhexanoate (3GO, 40 parts by weight), IR-906 (in an amount corresponding to 0.014% by weight in 100% by weight of the interlayer film to be obtained), UVA (1 part by weight), and BHT (1 part by weight) were mixed in a horizontal microbead mill, so that a dispersion was obtained.

The whole amount of the dispersion was added to 100 parts by weight of the resin A (polyvinyl butyral resin), and the mixture was sufficiently kneaded using a mixing mill. Thereby, a composition was obtained.

The obtained composition was sandwiched with clearance plates (having the same thickness as the interlayer film to be obtained) between two fluororesin sheets, and they were press-molded at 150° C. for 30 minutes such that a 760-μm-thick interlayer film was produced.

Using the obtained interlayer film, laminated glass including a single-layered interlayer film was obtained in the same manner as in Example 1.

Comparative Examples 2 to 12

An interlayer film was produced in the same manner as in Comparative Example 1, except that the kinds and amounts of the thermoplastic resin, the plasticizer, the metal oxide particles, and the component X were changed to those shown in the following Table 2. Using the obtained interlayer film, laminated glass including a single-layered interlayer film was obtained in the same manner as in Comparative Example 1.

Example 9

A first heat-shielding layer and a second heat-shielding layer were produced in the same manner as in Example 1, except that the kind and amount of the metal oxide particles for the second heat-shielding layer were changed to those shown in the following Table 3, and that the metal salt A in an amount shown in the following Table 3 was used for each of the first heat-shielding layer and the second heat-shielding layer. For the first heat-shielding layer and the second heat-shielding layer in Example 9, the amount used of UVA was 1 part by weight and the amount used of BHT was 1 part by weight for each 100 parts by weight of the thermoplastic resin, as in Example 1. Using the obtained first and second heat-shielding layers, laminated glass including two interlayer films was produced in the same manner as in Example 1.

Comparative Example 13

An interlayer film was produced in the same manner as in Comparative Example 1, except that the kinds and amounts of the thermoplastic resin, the plasticizer, the metal oxide particles, and the component X were changed to those shown in the following Table 4, and that the metal salt A was used in an amount shown in the following Table 4. Using the obtained interlayer film, laminated glass including a single-layered interlayer film was obtained in the same manner as in Comparative Example 1.

Examples 10 and 11

First and second heat-shielding layers were produced in the same manner as in Example 1, except that the kinds and amounts of the thermoplastic resin, the plasticizer, the metal oxide particles, and the component X for each of the first heat-shielding layer and the second heat-shielding layer were set as shown in the following Table 5 or 6, and that the metal salt A was used in a ratio shown in the following Table 5 or 6 for each of the first heat-shielding layer and the second heat-shielding layer. For the first heat-shielding layer and the second heat-shielding layer in Examples 10 and 11, the amount used of UVA was 1 part by weight and the amount used of BHT was 1 part by weight for each 100 parts by weight of the thermoplastic resin, as in Example 1. Using the obtained first heat-shielding layer and the second heat-shielding layer, laminated glass including two interlayer films was produced in the same manner as in Example 1.

Evaluation (1) Measurement of Visible Transmittance (Y Value Under Illuminant A, Initial A-Y (380 to 780 nm))

The visible transmittance of the obtained laminated glass at a wavelength of 380 to 780 nm was measured using a spectrophotometer ("U-4100" produced by Hitachi High-Technologies Corporation) in accordance with JIS R 3211 (1998).

(2) Measurement of Solar Transmittance (Initial Ts2500 (300 to 2500 nm))

The solar transmittance Ts (Ts2500) of the obtained laminated glass at a wavelength of 300 to 2500 nm was measured using a spectrophotometer ("U-4100" produced by Hitachi High-Technologies Corporation) in accordance with JIS R 3106 (1998).

(3) Measurement of Light Transmittance (Initial T900 (900 nm) and Initial T950 (nm))

The light transmittance (T900 (900 nm) and T950 (950 nm)) of the obtained laminated glass at a wavelength of 900 to 950 nm was measured using a spectrophotometer ("U-4100" produced by Hitachi High-Technologies Corporation) by the method based on JIS R 3106 (1998).

(4) Measurement of Haze Value

The haze value of the obtained laminated glass was measured using a haze meter ("TC-HIIIDPK" produced by Tokyo Denshoku Co., Ltd.) in accordance with JIS K 6714.

(5) Long-Term Stability (Light Resistance)

Using a device such as an ultraviolet lamp ("HLG-2S" produced by Suga Test Instruments Co., Ltd.), the laminated glass was irradiated with ultraviolet rays (quartz glass mercury lamp (750 W)) for 500 hours and for 1000 hours in accordance with JIS R 3205. The A-Y, Ts2500, T900, and T950 of the laminated glass after the 500-hour irradiation and after the 1000-hour irradiation were measured by the above methods.

From the measured values, ΔA-Y (initial A-Y-A-Y after ultraviolet irradiation), ΔTs2500 (initial Ts2500-Ts2500 after ultraviolet irradiation), ΔT900 (initial T900-T900 after ultraviolet irradiation), and ΔT950 (initial T950-T950 after ultraviolet irradiation) were determined.

The compositions of the interlayer films and the evaluation results thereof are shown in the following Tables 1 to 6. For Tables 1 to 6, the amounts of UVA and BHT were omitted. The amount of each plasticizer shown in Tables 1 to 6 refers to the amount (parts by weight) of the plasticizer for each 100 parts by weight of the thermoplastic resin. The amounts of the component X and the metal oxide particles shown in Tables 1, 3, 5, and 6 refer to the respective amounts (% by weight) of the component X and the metal oxide particles in 100% by weight of the first heat-shielding layer or the second heat-shielding layer. The amount of each component X in Tables 2 and 4 refers to the amount of the component X and the metal oxide particles in 100% by weight of the interlayer film. The amount of each metal salt shown in Tables 3, 5, and 6 refers to the magnesium concentration (ppm) in the first heat-shielding layer or the second heat-shielding layer.

TABLE 1

| | First heat-shielding layer composition | | | | | | Second heat-shielding layer composition | | | | | | |
|---|---|---|---|---|---|---|---|---|---|---|---|---|---|
| | Thermoplastic resin | | Plasticizer | | Component X | | Thermoplastic resin | | Plasticizer | | Metal oxide particles | | |
| | Thickness μm | Kind | Amount Parts by weight | Kind | Amount Parts by weight | Kind | Amount % by weight | Thickness μm | Kind | Amount Parts by weight | Kind | Amount Parts by weight | Kind | Amount % by weight | Number of layers |
| Ex. 1 | 380 | Resin A | 100 | 3GO | 40 | IR-906 | 0.032 | 380 | Resin A | 100 | 3GO | 40 | ITO | 0.40 | 2 |
| Ex. 2 | 380 | Resin A | 100 | 3GO | 40 | IR-906 | 0.028 | 380 | Resin A | 100 | 3GO | 40 | ITO | 0.80 | 2 |
| Ex. 3 | 380 | Resin A | 100 | 3GO | 40 | IR-915 | 0.038 | 380 | Resin A | 100 | 3GO | 40 | ITO | 0.40 | 2 |
| Ex. 4 | 380 | Resin A | 100 | 3GO | 40 | IR-915 | 0.034 | 380 | Resin A | 100 | 3GO | 40 | ITO | 0.80 | 2 |
| Ex. 5 | 100 | Resin B | 100 | 3GO | 60 | IR-906 | 0.122 | 350 | Resin A | 100 | 3GO | 40 | ITO | 0.22 | 3 |
| Ex. 6 | 100 | Resin B | 100 | 3GO | 60 | IR-906 | 0.106 | 350 | Resin A | 100 | 3GO | 40 | ITO | 0.43 | 3 |
| Ex. 7 | 100 | Resin B | 100 | 3GO | 60 | IR-915 | 0.144 | 350 | Resin A | 100 | 3GO | 40 | ITO | 0.22 | 3 |
| Ex. 8 | 100 | Resin B | 100 | 3GO | 60 | IR-915 | 0.129 | 350 | Resin A | 100 | 3GO | 40 | ITO | 0.43 | 3 |

| | Evaluation | | | | | | | | | | | |
|---|---|---|---|---|---|---|---|---|---|---|---|---|
| | Initial stage | | | | After ultraviolet irradiation (500 hrs) | | | | After ultraviolet irradiation (1000 hrs) | | | |
| | A-Y % | Ts2500 % | T900 % | T950 % | Haze value | ΔA-Y % | ΔTs2500 % | ΔT900 % | ΔT950 % | ΔA-Y % | ΔTs2500 % | ΔT900 % | ΔT950 % |
| Ex. 1 | 71.7 | 49.7 | 14.9 | 21.9 | 0.3 | −1.2 | −1.7 | 2.2 | 1.0 | −1.7 | −1.7 | 3.9 | 2.3 |
| Ex. 2 | 72.0 | 46.8 | 16.6 | 22.5 | 0.4 | −1.3 | −1.6 | 1.7 | 0.2 | −1.7 | −1.8 | 3.2 | 1.3 |
| Ex. 3 | 71.7 | 48.7 | 26.1 | 8.3 | 0.3 | −0.8 | −1.4 | 0.9 | 0.7 | −1.0 | −1.3 | 2.4 | 2.0 |
| Ex. 4 | 72.1 | 46.1 | 27.3 | 9.8 | 0.4 | −0.9 | −1.3 | 0.1 | 0.4 | −1.1 | −1.4 | 1.4 | 1.6 |
| Ex. 5 | 71.6 | 49.5 | 14.8 | 21.7 | 0.3 | −1.1 | −1.7 | 2.0 | 0.9 | −1.8 | −1.6 | 4.0 | 2.2 |
| Ex. 6 | 71.9 | 46.7 | 16.4 | 22.3 | 0.4 | −1.2 | −1.5 | 1.5 | 0.1 | −1.8 | −1.9 | 3.3 | 1.5 |
| Ex. 7 | 71.5 | 48.5 | 26.0 | 8.1 | 0.3 | −0.7 | −1.4 | 0.8 | 0.8 | −1.0 | −1.4 | 2.5 | 1.9 |
| Ex. 8 | 72.0 | 46.0 | 27.1 | 9.5 | 0.4 | −0.8 | −1.2 | 0.0 | 0.5 | −1.2 | −1.4 | 1.2 | 1.7 |

TABLE 2

| | Interlayer film composition | | | | | | | | |
|---|---|---|---|---|---|---|---|---|---|
| | | Thermoplastic resin | | Plasticizer | | Metal oxide particles | | Component X | | |
| | Thickness μm | Kind | Amount Parts by weight | Kind | Amount Parts by weight | Kind | Amount | Kind | Amount % by weight | Number of layers |
| Comp. Ex. 1 | 760 | Resin A | 100 | 3GO | 40 | — | — | IR-906 | 0.014 | 1 |
| Comp. Ex. 2 | 760 | Resin A | 100 | 3GO | 40 | — | — | IR-906 | 0.016 | 1 |
| Comp. Ex. 3 | 760 | Resin A | 100 | 3GO | 40 | ITO | 0.20 | IR-906 | 0.016 | 1 |
| Comp. Ex. 4 | 760 | Resin A | 100 | 3GO | 40 | ITO | 0.40 | IR-906 | 0.014 | 1 |
| Comp. Ex. 5 | 760 | Resin A | 100 | 3GO | 40 | — | — | IR-915 | 0.017 | 1 |
| Comp. Ex. 6 | 760 | Resin A | 100 | 3GO | 40 | — | — | IR-915 | 0.019 | 1 |
| Comp. Ex. 7 | 760 | Resin A | 100 | 3GO | 40 | ITO | 0.20 | IR-915 | 0.019 | 1 |
| Comp. Ex. 8 | 760 | Resin A | 100 | 3GO | 40 | ITO | 0.40 | IR-915 | 0.017 | 1 |
| Comp. Ex. 9 | 760 | Resin A | 100 | 3GO | 40 | — | — | — | — | 1 |
| Comp. Ex. 10 | 760 | Resin A | 100 | 3GO | 40 | ITO | 0.20 | — | — | 1 |
| Comp. Ex. 11 | 760 | Resin A | 100 | 3GO | 40 | ITO | 0.40 | — | — | 1 |
| Comp. Ex. 12 | 760 | Resin A | 100 | 3GO | 40 | ITO | 0.70 | — | — | 1 |

| | Evaluation | | | | | | | | | | | |
|---|---|---|---|---|---|---|---|---|---|---|---|---|
| | Initial stage | | | | | After ultraviolet irradiation (500 hrs) | | | | After ultraviolet irradiation (1000 hrs) | | | |
| | A-Y % | Ts2500 % | T900 % | T950 % | Haze value % | ⊿ A-Y % | ⊿ Ts2500 % | ⊿ T900 % | ⊿ T950 % | ⊿ A-Y % | ⊿ Ts2500 % | ⊿ T900 % | ⊿ T950 % |
| Comp. Ex. 1 | 74.4 | 63.5 | 19.1 | 27.4 | 0.3 | −0.4 | 0.0 | 2.2 | 1.5 | −0.6 | −0.3 | 3.7 | 2.7 |
| Comp. Ex. 2 | 72.7 | 62.1 | 15.8 | 23.8 | 0.3 | −0.4 | 0.0 | 2.1 | 1.5 | −0.7 | −0.4 | 3.6 | 2.7 |
| Comp. Ex. 3 | 71.5 | 50.1 | 14.6 | 21.6 | 0.3 | −2.3 | −2.2 | 6.9 | 4.2 | −2.7 | −2.0 | 11.2 | 7.2 |
| Comp. Ex. 4 | 71.8 | 46.8 | 16.3 | 22.2 | 0.4 | −2.2 | −1.6 | 6.0 | 3.0 | −2.6 | −1.6 | 9.8 | 5.4 |
| Comp. Ex. 5 | 76.8 | 64.7 | 36.1 | 15.6 | 0.3 | −0.4 | −0.8 | 0.4 | 0.5 | −0.1 | −0.4 | 1.3 | 1.3 |
| Comp. Ex. 6 | 78.1 | 65.9 | 39.3 | 18.8 | 0.3 | −0.4 | −0.7 | 0.4 | 0.5 | −0.1 | −0.4 | 1.2 | 1.4 |
| Comp. Ex. 7 | 71.9 | 49.5 | 23.7 | 8.9 | 0.3 | −1.7 | −1.4 | 5.4 | 3.6 | −2.2 | −1.1 | 7.6 | 6.1 |
| Comp. Ex. 8 | 71.9 | 46.1 | 24.4 | 9.8 | 0.4 | −1.7 | −1.5 | 4.3 | 3.1 | −2.2 | −1.7 | 6.1 | 5.3 |
| Comp. Ex. 9 | 88.0 | 76.9 | 74.2 | 73.4 | 0.3 | −0.4 | 0.4 | 1.1 | 1.2 | −0.5 | 0.3 | 1.1 | 1.1 |
| Comp. Ex. 10 | 86.4 | 64.4 | 68.2 | 65.7 | 0.3 | −0.4 | −0.9 | −0.3 | −0.5 | −0.5 | −1.5 | −0.5 | −0.8 |
| Comp. Ex. 11 | 84.7 | 59.6 | 62.6 | 58.8 | 0.4 | −0.9 | −1.0 | −0.6 | −0.9 | −1.0 | −1.6 | −1.0 | −1.3 |
| Comp. Ex. 12 | 82.3 | 54.7 | 55.2 | 49.8 | 0.5 | −1.4 | −1.1 | −0.9 | −1.3 | −1.7 | −1.9 | −1.5 | −2.0 |

TABLE 3

| | First heat-shielding layer composition | | | | | | | | |
|---|---|---|---|---|---|---|---|---|---|
| | | Thermoplastic resin | | Plasticizer | | Component X | | Metal salt | |
| | Thickness μm | Kind | Amount Parts by weight | Kind | Amount Parts by weight | Kind | Amount % by weight | Kind | Amount Mg/ppm |
| Ex. 9 | 380 | Resin A | 100 | 3GO | 40 | IR-906 | 0.032 | Metal salt A | 70.00 |

| | Second heat-shielding layer composition | | | | | | | | | |
|---|---|---|---|---|---|---|---|---|---|---|
| | | Thermoplastic resin | | Plasticizer | | Metal oxide particles | | Metal salt | | Number |
| | Thickness μm | Kind | Amount Parts by weight | Kind | Amount % by weight | Kind | Amount % by weight | Kind | Amount Mg/ppm | of layers |
| Ex. 9 | 380 | Resin A | 100 | 3GO | 40 | CWO | 0.20 | Metal salt A | 70.00 | 2 |

TABLE 3-continued

| | Evaluation | | | | | | | |
|---|---|---|---|---|---|---|---|---|
| | Initial stage | | | | After ultraviolet irradiation (500 hrs) | | | |
| | A-Y % | Ts2500 % | T900 % | T950 % | Haze value % | ⊿A-Y % | ⊿Ts2500 % | ⊿T900 % | ⊿T950 % |
| Ex. 9 | 76.4 | 37.7 | 6.7 | 8.4 | 0.4 | −1.7 | −1.7 | 1.1 | 0.3 |

TABLE 4

| | Interlayer film composition | | | | | | | | |
|---|---|---|---|---|---|---|---|---|---|
| | | Thermoplastic resin | | Plasticizer | | | | Component X | |
| | Thickness μm | Kind | Amount Parts by weight | Kind | Amount Parts by weight | Metal oxide particles Kind | Amount | Kind | Amount % by weight | Number of layers |
| Comp. Ex. 13 | 760 | Resin A | 100 | 3GO | 40 | CWO | 0.10 | IR-906 | 0.016 | 1 |

| | Evaluation | | | | | | | | |
|---|---|---|---|---|---|---|---|---|---|
| | Initial stage | | | | | After ultraviolet irradiation (500 hrs) | | | |
| | A-Y % | Ts2500 % | T900 % | T950 % | Haze value % | ⊿A-Y % | ⊿Ts2500 % | ⊿T900 % | ⊿T950 % |
| Comp. Ex. 13 | 76.5 | 37.8 | 6.8 | 8.3 | 0.3 | −2.8 | −2.7 | 3.9 | 2.3 |

TABLE 5

| | First heat-shielding layer composition | | | | | | | | |
|---|---|---|---|---|---|---|---|---|---|
| | | Thermoplastic resin | | Plasticizer | | Component X | | Metal salt | |
| | Thickness μm | Kind | Amount Parts by weight | Kind | Amount Parts by weight | Kind | Amount % by weight | Kind | Amount Mg/ppm |
| Ex. 10 | 380 | Resin A | 100 | 3GO | 40 | IR-906 | 0.016 | Metal salt A | 70.00 |

| | Second heat-shielding layer composition | | | | | | | | | | |
|---|---|---|---|---|---|---|---|---|---|---|---|
| | | Thermoplastic resin | | Plasticizer | | Metal oxide particles | | Component X | | Metal salt | |
| | Thickness μm | Kind | Amount Parts by weight | Kind | Amount % by weight | Kind | Amount % by weight | Kind | Amount % by weight | Kind | Amount Mg/ppm | Number of layers |
| Ex. 10 | 380 | Resin A | 100 | 3GO | 40 | CWO | 0.20 | IR-906 | 0.016 | Metal salt A | 70.00 | 2 |

| | Evaluation | | | | | | | | |
|---|---|---|---|---|---|---|---|---|---|
| | Initial stage | | | | | After ultraviolet irradiation (500 hrs) | | | |
| | A-Y % | Ts2500 % | T900 % | T950 % | Haze value % | ⊿A-Y % | ⊿Ts2500 % | ⊿T900 % | ⊿T950 % |
| Ex. 10 | 76.4 | 37.7 | 6.7 | 8.4 | 0.4 | −2.1 | −2.1 | 2.1 | 0.8 |

TABLE 6

| | First heat-shielding layer composition | | | | | | | |
|---|---|---|---|---|---|---|---|---|
| | | Thermoplastic resin | | Plasticizer | | Component X | | Metal salt | |
| | Thickness µm | Kind | Amount Parts by weight | Kind | Amount Parts by weight | Kind | Amount % by weight | Kind | Amount Mg/ppm |
| Ex. 11 | 380 | Resin A | 100 | 3GO | 40 | NIR-43V | 0.016 | Metal salt A | 70.00 |

| | Second heat-shielding layer composition | | | | | | | | |
|---|---|---|---|---|---|---|---|---|---|
| | | Thermoplastic resin | | Plasticizer | | Metal oxide particles | | Metal salt | | Number |
| | Thickness µm | Kind | Amount Parts by weight | Kind | Amount % by weight | Kind | Amount % by weight | Kind | Amount Mg/ppm | of layers |
| Ex. 11 | 380 | Resin A | 100 | 3GO | 40 | CWO | 0.20 | Metal salt A | 70.00 | 2 |

| | Evaluation | | | | | | | | |
|---|---|---|---|---|---|---|---|---|---|
| | Initial stage | | | | | After ultraviolet irradiation (500 hrs) | | | |
| | A-Y % | Ts2500 % | T900 % | T950 % | Haze value % | ⊿ A-Y ⊿ % | Ts250C⊿ % | T900⊿ % | T950 % |
| Ex. 11 | 73.4 | 34.0 | 19.3 | 18.3 | 0.4 | −1.0 | −1.0 | −0.9 | −0.8 |

| EXPLANATION OF SYMBOLS | |
|---|---|
| 1 | Interlayer film |
| 2 | First heat-shielding layer |
| 2a | First surface |
| 2b | Second surface |
| 3 | Second heat-shielding layer |
| 3a | Outer surface |
| 11 | Interlayer film |
| 12 | First heat-shielding layer |
| 12a | First surface |
| 12b | Second surface |
| 13, 14 | Second heat-shielding layer |
| 21 | Interlayer film |
| 22 | First heat-shielding layer |
| 22a | First surface |
| 23 | Second heat-shielding layer |
| 23a | First surface |
| 23b | Second surface |
| 24 | First heat-shielding layer |
| 51 | Laminated glass |
| 52 | First member for laminated glass |
| 53 | Second member for laminated glass |

The invention claimed is:

1. An interlayer film for laminated glass, comprising a first heat-shielding layer containing a thermoplastic resin and at least one component selected from a phthalocyanine compound, a naphthalocyanine compound, and an anthracocyanine compound, and
at least one second heat-shielding layer containing a thermoplastic resin and metal oxide particles.

2. The interlayer film for laminated glass according to claim 1 wherein the component selected from the phthalocyanine compound, the naphthalocyanine compound, and the anthracocyanine compound contains vanadium atom(s).

3. The interlayer film for laminated glass according to claim 1,
wherein the component selected from phthalocyanine compound, the naphthalocyanine compound, and the anthracocyanine compound is at least one selected from phthalocyanine and phthalocyanine derivative.

4. The interlayer for aminated glass according to claims 1,
wherein the metal oxide particles are tin-doped indium oxide particles or caesium-doped tungsten oxide particles.

5. The interlayer film for laminated glass according to claim 4,
wherein the metal oxide particles are tin-doped indium oxide particles.

6. The interlayer film for laminated glass according to claim 1,
wherein the thermoplastic resin included in the first beat-shielding layer and the thermoplastic resin included in the second heat-shielding layer each are a polyvinyl acetal resin.

7. The interlayer film for laminated glass according to claim 1,
wherein the first beat-shielding layer and the second heat-shielding layer each further contain a plasticizer.

8. The interlayer film for laminated glass according to claim 1,
wherein the second heat-shielding layer is laminated on a first surface of the first heat-shielding layer.

9. The interlayer film for laminated glass according to claim 8,
wherein one second heat-shielding layer is laminated on the first surface of the first heat-shielding layer, and another second heat-shielding layer is laminated on a second surface of the first heat-shielding layer which is on the opposite side of the first surface.

10. Laminated glass comprising
a first member for laminated glass,
a second member for laminated glass, and an interlayer film sandwiched between the first member for laminated glass and the second member for laminated glass,
wherein the interlayer film is the interlayer film for laminated glass according to claim 1.

\* \* \* \* \*